United States Patent
Ibuki et al.

(10) Patent No.: US 9,537,441 B2
(45) Date of Patent: Jan. 3, 2017

(54) EPILATOR AND METHOD FOR DRIVING EPILATOR

(71) Applicant: Panasonic Intellectual Property Management Co., Ltd., Osaka (JP)

(72) Inventors: Yasuo Ibuki, Shiga (JP); Takafumi Ohba, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 112 days.

(21) Appl. No.: 14/409,423

(22) PCT Filed: May 20, 2013

(86) PCT No.: PCT/JP2013/003205
§ 371 (c)(1),
(2) Date: Dec. 18, 2014

(87) PCT Pub. No.: WO2014/013659
PCT Pub. Date: Jan. 23, 2014

(65) Prior Publication Data
US 2015/0288312 A1 Oct. 8, 2015

(30) Foreign Application Priority Data

Jul. 18, 2012 (JP) ................. 2012-159620

(51) Int. Cl.
*H02P 1/16* (2006.01)
*H02P 25/02* (2016.01)
(Continued)

(52) U.S. Cl.
CPC ........... *H02P 25/027* (2013.01); *B26B 19/282* (2013.01); *H02K 35/02* (2013.01); *H02P 1/16* (2013.01); *H02P 6/182* (2013.01); *H02P 25/032* (2016.02)

(58) Field of Classification Search
CPC .................................................. H02P 25/027
(Continued)

(56) References Cited

U.S. PATENT DOCUMENTS 5,274,735 A 12/1993 Okada
5,367,599 A 11/1994 Okada
(Continued)

FOREIGN PATENT DOCUMENTS

CN 2403552 Y 11/2000
EP 2667504 A1 11/2013
(Continued)

OTHER PUBLICATIONS

International Search Report issued in International Application No. PCT/JP2013/003205 dated Aug. 6, 2013.
(Continued)

*Primary Examiner* — David S Luo
(74) *Attorney, Agent, or Firm* — McDermott Will & Emery LLP

(57) ABSTRACT

An electric razor is provided with a linear actuator having a stator which includes an electromagnet and also having a moving element which includes a permanent magnet. The electric razor is also provided with an amplitude control unit and a control/output unit, which detect the amplitude and speed of the moving element on the basis of an induced voltage occurring in the winding of the stator as the moving element reciprocates, compare the detected speed and a formerly detected speed, and, according to the difference representing the result of the comparison, change a method for controlling the moving element.

8 Claims, 7 Drawing Sheets

(51) Int. Cl.
*B26B 19/28* (2006.01)
*H02K 35/02* (2006.01)
*H02P 6/18* (2016.01)

(58) Field of Classification Search
USPC .......................................... 318/129, 126, 119
See application file for complete search history.

(56) References Cited

U.S. PATENT DOCUMENTS

| | | | | |
|---|---|---|---|---|
| 5,611,804 | A * | 3/1997 | Heintke | A45D 26/00 |
| | | | | 30/34.05 |
| 5,632,087 | A | 5/1997 | Motohashi et al. | |
| 5,692,529 | A | 12/1997 | Fekete | |
| 5,761,812 | A | 6/1998 | Feldman | |
| 5,955,799 | A | 9/1999 | Amaya et al. | |
| 6,002,234 | A * | 12/1999 | Ohm | H02P 6/06 |
| | | | | 318/438 |
| 6,351,089 | B1 | 2/2002 | Ibuki et al. | |
| 7,026,779 | B2 * | 4/2006 | Eba | G05B 19/19 |
| | | | | 318/560 |
| 7,151,348 | B1 | 12/2006 | Ueda et al. | |
| 8,324,849 | B2 * | 12/2012 | Kuo | H02P 6/16 |
| | | | | 318/400.12 |
| 2005/0146296 | A1 | 7/2005 | Klemm et al. | |
| 2005/0275294 | A1 | 12/2005 | Izumi et al. | |
| 2009/0243519 | A1 | 10/2009 | Izumi et al. | |

FOREIGN PATENT DOCUMENTS

| | | |
|---|---|---|
| JP | 6-86873 A | 3/1994 |
| JP | 7-265559 A | 10/1995 |
| JP | 9-65634 A | 3/1997 |
| JP | 10-243622 | 9/1998 |
| JP | 2001-16892 A | 1/2001 |
| JP | 2002-306867 A | 10/2002 |
| JP | 2004-336988 A | 11/2004 |
| JP | 2005-532018 A | 10/2005 |
| JP | 2006-34082 A | 2/2006 |
| JP | 2009-240047 A | 10/2009 |

OTHER PUBLICATIONS

The Extended European Search Report dated Nov. 6, 2015, issued in corresponding European Patent Application 13819204.2.
International Preliminary Report on Patentability and Written Opinion issued in counterpart International Patent Application No. PCT/JP2013/003205 on Jan. 20, 2015; 5 pages In English language.
Notification of First Office Action issued in corresponding Chinese Patent Application No. 201380032922.4, mailed Jul. 21, 2015; with English translation.

* cited by examiner

EPILATOR AND METHOD FOR DRIVING EPILATOR

CROSS-REFERENCE TO RELATED APPLICATIONS

The present application is the U.S. National Phase of PCT/JP2013/003205 filed May 20, 2013, which claims priority to Japanese Patent Application No. 2012-159620 filed Jul. 18, 2012. The disclosures of the above applications are incorporated herein by reference.

TECHNICAL FIELD

The present invention relates to a hair removal device that reciprocates a movable element to remove hair and a method for driving a hair removal device.

BACKGROUND ART

In the prior art, a known hair removal device (such as an electric shaver) includes a fixed element formed by an electromagnet, a movable element including a permanent magnet, and a controller controlling drive current supplied to a coil of the electromagnet. Such a hair removal device uses a linear actuator that oscillates and moves the movable element back and forth relative to the fixed element to remove hair. For example, patent document 1 discloses a hair removal device and proposes a technique that detects induced voltage generated in a coil of an electromagnet to detect motion (movement, speed, or acceleration) of a movable element. This hair removal device includes a controller to control the amplitudes of the movable element and an internal blade to be a predetermined fixed value.

PRIOR ART DOCUMENT

Patent Document

Patent Document 1: Japanese Laid-Open Patent Publication No. 2001-16892

SUMMARY OF THE INVENTION

Problems that are to be Solved by the Invention

However, the above hair removal device controls the amplitudes of the movable element and the internal blade to be the predetermined fixed value based on the detected induced voltage. Thus, the optimal control may not be performed depending on the situation.

It is an object of the present invention to provide a hair removal device that is capable of performing further optimal control that is in accordance with each situation and a method for driving a hair removal device.

Means for Solving the Problem

One aspect of the present invention is a hair removal device and a method for driving a hair removal device. The hair removal device includes a linear actuator that includes a fixed element, which includes one of an electromagnet and a permanent magnet, and a movable element, which includes the other of the electromagnet and the permanent magnet. The hair removal device includes a detection unit that detects at least one of movement, speed, and acceleration of the movable element, and a control unit that compares a detected value of the detection unit with a detected value obtained in the past and changes a control mode of the movable element in accordance with a difference indicating a comparison result.

Preferably, in the hair removal device, the control unit changes the control mode of the movable element from a normal control to a power-up control that increases the speed of the movable element when determining that the comparison result satisfies a predetermined power-up determination condition.

Preferably, in the hair removal device, the power-up determination condition includes a determination condition that is satisfied when the comparison result satisfies a predetermined power-up factor condition a predetermined number of times or more within a predetermined period or within predetermined number of cycles of the movable element.

Preferably, in the hair removal device, the power-up determination condition or the power-up factor condition includes a first condition that is satisfied when the detected value is larger than the preceding detected value by a predetermined first set value or greater and the preceding detected value is smaller than the further preceding detected value.

Preferably, in the hair removal device, the power-up determination condition or the power-up factor condition includes a second condition that is satisfied when a difference of the detected value and the preceding detected value is larger than or equal to a predetermined second set value.

Preferably, in the hair removal device, the control unit changes a condition that changes the control mode of the movable element in accordance with an elapsed time from when the movable element is activated.

Preferably, in the hair removal device, the control unit counts time from when the control mode of the movable element is changed until a predetermined recovery setting period elapses, determines whether or not to continue the control mode, which has been changed in accordance with the comparison result, during the recovery setting period, resets a count value related to the recovery setting period when determining to continue the control mode within the recovery setting period, and returns the control mode to an original control mode when determining to discontinue the control mode within the recovery setting period.

Preferably, in the hair removal device, the control unit returns the control mode to an original control mode when a predetermined recovery setting period elapses after the control mode of the movable element is changed.

A method for driving a hair removal device provided with a linear actuator that includes a fixed element, which includes one of an electromagnet and a permanent magnet, and a movable element, which includes the other of the electromagnet and the permanent magnet, includes detecting at least one of movement, speed, and acceleration of the movable element, comparing a detected value with a detected value obtained in the past, and changing a control mode of the movable element in accordance with a difference indicating a comparison result.

Effects of the Invention

The present invention provides a hair removal device that is capable of performing further optimal control that is in accordance with each situation and a method for driving a hair removal device.

EMBODIMENTS OF THE INVENTION

One embodiment of a hair removal device according to the present invention will now be described with reference to FIGS. 1 to 7.

Figure 1:
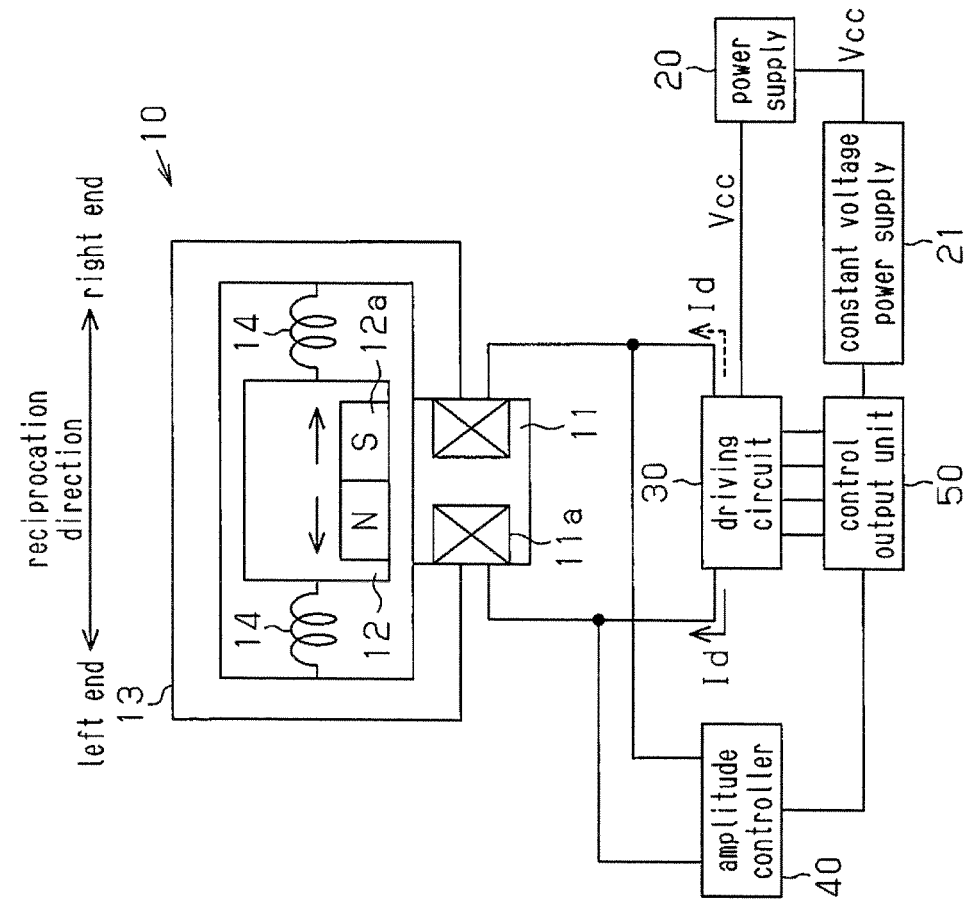
FIG. 1 is a block diagram showing a configuration example of one embodiment of an electric shaver.

As shown FIG. 1, a linear actuator 10, which forms a portion of an electric shaver 1 that functions as a hair removal device, includes a fixed element 11 and a movable element 12. The fixed element 11 is formed by an electromagnet. For example, the electromagnet is formed by a coil 11a wound around a lamination of sinters or iron plates formed from a magnetic material. The fixed element 11 is fastened to a frame 13.

The movable element 12 is supported in the frame 13 by springs 14 and is movable back and forth. The movable element 12 includes a permanent magnet 12a. The permanent magnet 12a is opposed to the fixed element 11 and separated from the fixed element 11 by a predetermined distance. Also, the permanent magnet 12a is magnetized to generate a magnetic field in a reciprocation direction of the movable element 12 (in the drawing, sideward direction). The frame 13 holds an external blade (not shown). The movable element 12 is coupled to an internal blade (not shown). When the internal blade reciprocates (oscillates) together with the movable element 12, whiskers, which are drawn into the external blade, are sandwiched and cut by the external blade and the oscillating movable element.

One example of a configuration for driving the linear actuator 10 will now be described.

The driving circuit 30, which is connected to the coil 11a and operated by a power supply voltage Vcc from a power supply 20, supplies driving current Id to the coil 11a. An amplitude controller 40, which is connected to the coil 11a, detects the amplitude of the movable element 12 from an induced voltage generated at the coil 11a. The amplitude controller 40 determines that an abnormal load has been generated when detecting a temporal change in the load that is in accordance with a temporal change of a detected amplitude. The amplitude controller 40 determines the occurrence of a momentary change of the load in accordance with the temporal change of the amplitude. The amplitude controller 40 returns detected amplitude information to a control output unit 50.

Based on the amplitude information from the amplitude controller 40, the control output unit 50 performs pulse width modulation (PWM) control on a driving current Id supplied to the coil 11a, that is, provides a PWM signal to the driving circuit 30. The control output unit 50 of the present embodiment generates the PWM signal so that the driving current ID is supplied to the coil 11a in a frequency that is synchronized with a mechanical resonance frequency of the linear actuator 10. The mechanical resonance frequency of the linear actuator 10 is set by weight of the movable element 12, a spring constant of the spring 14, or the like. A constant voltage power supply 21 generates a constant voltage based on the power supply voltage Vcc and supplies the generated constant voltage, as an operation voltage, to the control output unit 50.

When the drive current Id, which is controlled in the above manner, flows to the coil 11a, the permanent magnet 12a located in the movable element 12 moves in the reciprocation direction (in the drawing, sideward direction) while deforming the spring 14 in accordance with the flow direction of the driving current Id. When the control output unit 50 performs a control to switch the flow direction of the driving current Id at an appropriate timing, the movable element 12 reciprocates in the sideward direction of the drawing.

An internal configuration example of the driving circuit 30 and the amplitude controller 40 will now be described.

First, an internal configuration example of the driving circuit 30 will be described.

Figure 2:
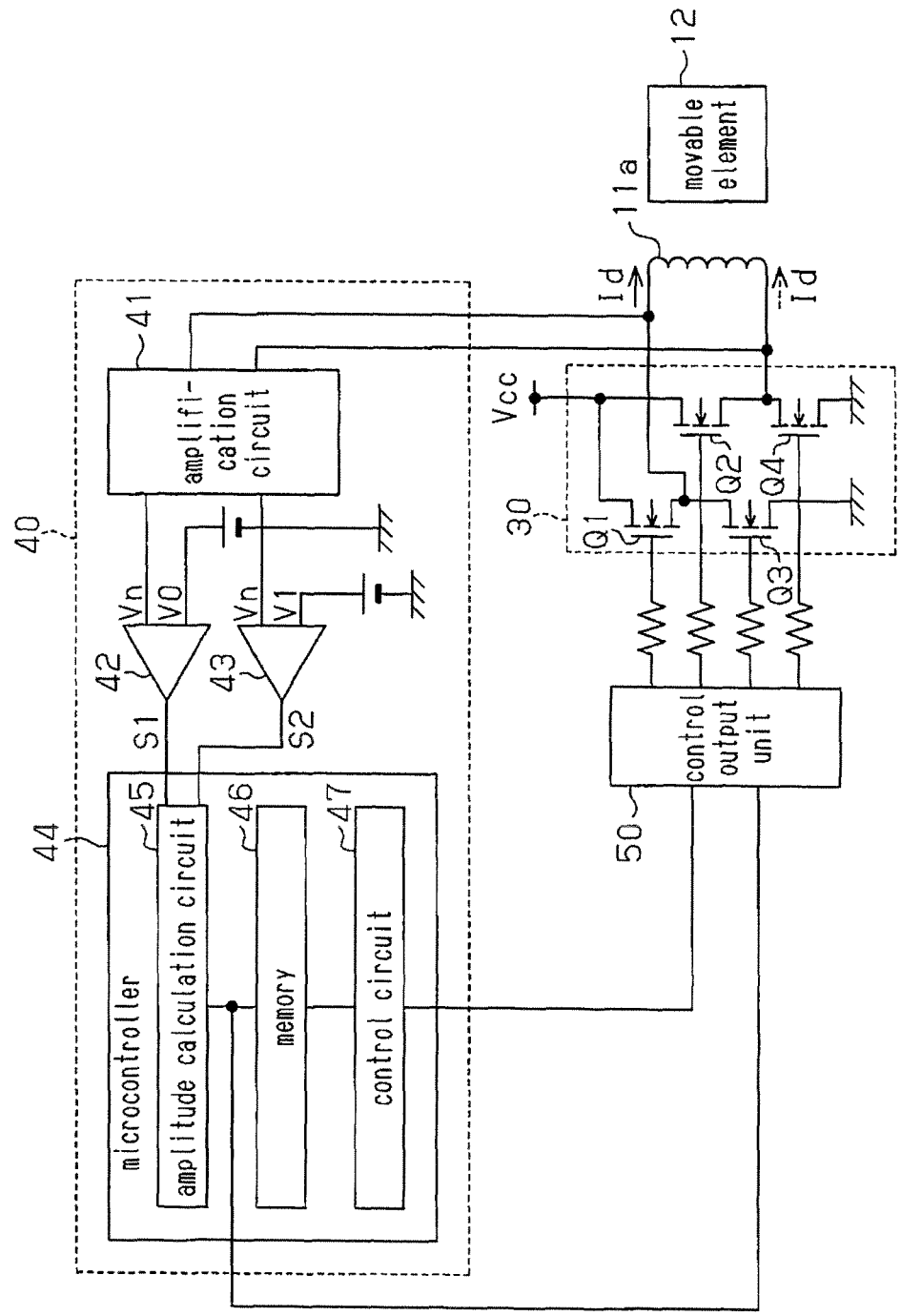
FIG. 2 is a block diagram showing an internal configuration example of a driving circuit and an amplitude controller.

As shown in FIG. 2, the driving circuit 30 is a full-bridge circuit formed by switching elements Q1 to Q4, such as MOSFETs. The coil 11a is connected between a connection point of the two switching elements Q1 and Q3 and a connection point of the two switching elements Q2 and Q4. The pair of the switching elements Q1 and Q4 and the pair of the switching elements Q2 and Q3 are alternately activated based on the PWM signal from the control output unit 50. The alternating activation switches the direction of the driving current Id supplied to the coil 11a. This reciprocates the movable element 12 between a first position and a second position.

Next, an internal configuration example of the amplitude controller 40 will be described.

An amplification circuit 41 amplifies the voltage of two terminals of the coil 11a, that is, an induced voltage E generated in the coil 11a. The amplification circuit 41 supplies two comparison circuits 42 and 43 with an amplified voltage Vn, which has been amplified. The comparison circuit 42 compares the amplified voltage Vn with a reference voltage V0, which is a null voltage. The comparison circuit 42 provides an amplitude (speed) calculation circuit 45, which is located in a microcontroller 44, with an output signal S1 having a signal level corresponding to the comparison result. Also, the comparison circuit 43 compares the amplified voltage Vn with a reference voltage V1 that is lower than the reference voltage V0 by a predetermined voltage. The comparison circuit 43 provides the amplitude calculation circuit 45 with an output signal S2 having a signal level corresponding to the comparison result. The reference voltage V1 may be set to be higher than the reference voltage V0 by a predetermined voltage.

The microcontroller 44 includes the amplitude calculation circuit 45, a memory 46, and a control circuit 47. The memory 46 stores the speed (amplitude) of the movable element 12 detected by the amplitude calculation circuit 45. The control circuit 47 changes a control mode of the movable element 12 in accordance with a comparison result of two speeds of different times stored in the memory 46. In the present embodiment, the control mode of the movable element 12 includes a power-up control, which is used to remove dense whiskers, and a normal control, which is used to remove sparse whiskers and irregular whiskers.

Figure 3:
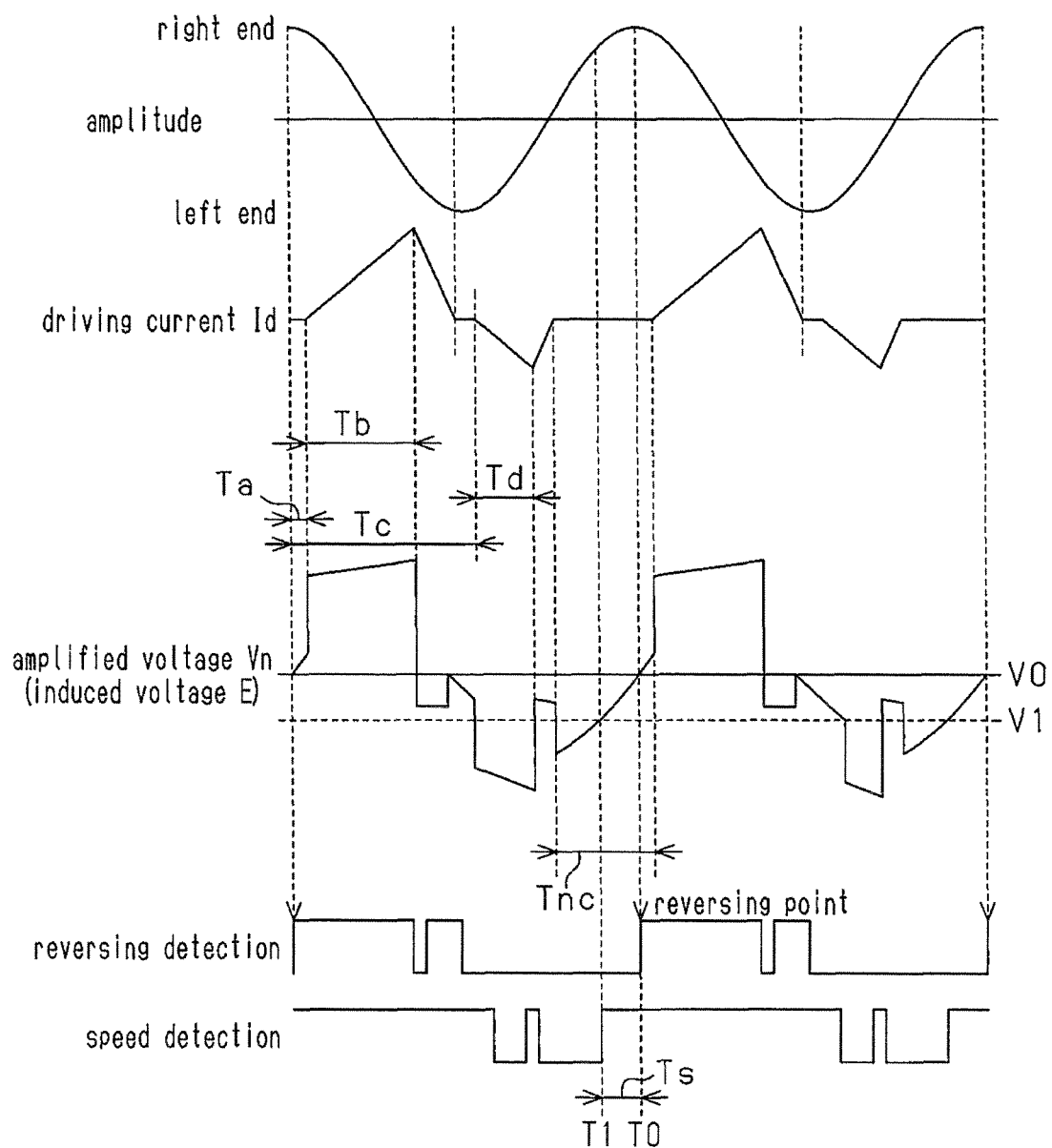
FIG. 3 is a timing chart illustrating detected values.
Figure 4:
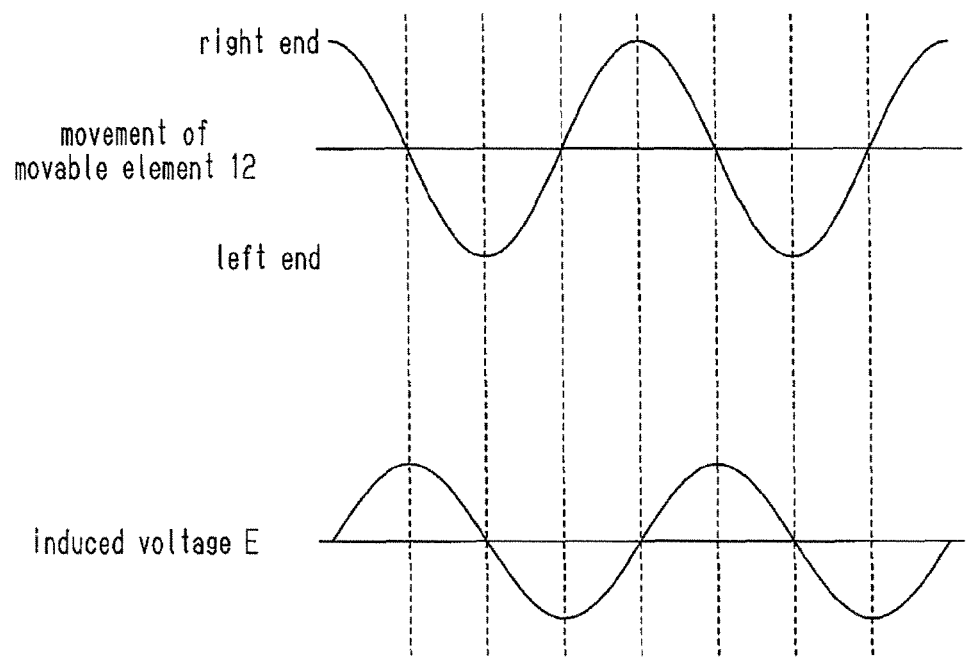
FIG. 4 is a timing chart illustrating detected values.

As shown in FIG. 3, based on the signal level of the output signal S1, the amplitude calculation circuit 45 detects the time T0 when the amplified voltage Vn reaches the reference voltage V0 (=0 V) and determines that the movable element 12 has reached a reversing point of reciprocation at time T0. More specifically, as shown in FIG. 4, the induced voltage E having a sine wave-like form is generated in the coil 11a in accordance with the reciprocation of the movable element 12. The wave form of the induced voltage E has the same frequency as a mechanical resonance frequency of the linear actuator 10. Also, the induced voltage E changes in correspondence with the amplitude, movement, speed of oscillation, acceleration of oscillation, direction of oscillation, or the like of the movable element 12. The induced voltage E becomes larger as the speed of the movable element 12 increases. For example, when the movable element 12 reciprocates and reaches the first or second position (right or left end), which is the reversing point, that is, when the speed of the movable element 12 becomes null, the permanent magnet 12a of the movable element 12 temporarily stops moving. Thus, there is no change in magnetic flux and the induced voltage E becomes a null voltage. Therefore, when the induced voltage E (amplified voltage Vn) of the coil 11a becomes a null voltage, it can be determined that the oscillation direction of the movable element 12 has been switched, that is, the movable element 12 has reached the reversing point of reciprocation.

Referring to FIG. 3, the amplitude calculation circuit 45 detects time T1 when the amplified voltage Vn reaches the reference voltage V1. Additionally, the amplitude calculation circuit 45 detects the time difference Ts from time T1 to time T0 and calculates the speed (amplitude) of the movable element 12 based on the time difference Ts. More specifically, the amplitude calculation circuit 45 measures the time (time difference Ts) from when the induced voltage E becomes the predetermined voltage (reference voltage V1) to the timing (time T0) when the direction of the amplitude changes. The amplitude calculation circuit 45 converts the time difference to speed (amplitude). More specifically, the linear actuator 10 oscillates at a constant frequency, and the position and speed of the movable element 12 change in accordance with a sine curve. Therefore, the measurement of the above time difference Ts allows for determination of the driving state (sine curve) of the linear actuator 10. Consequently, the speed (amplitude) of the movable element 12 can be determined.

Figure 5:
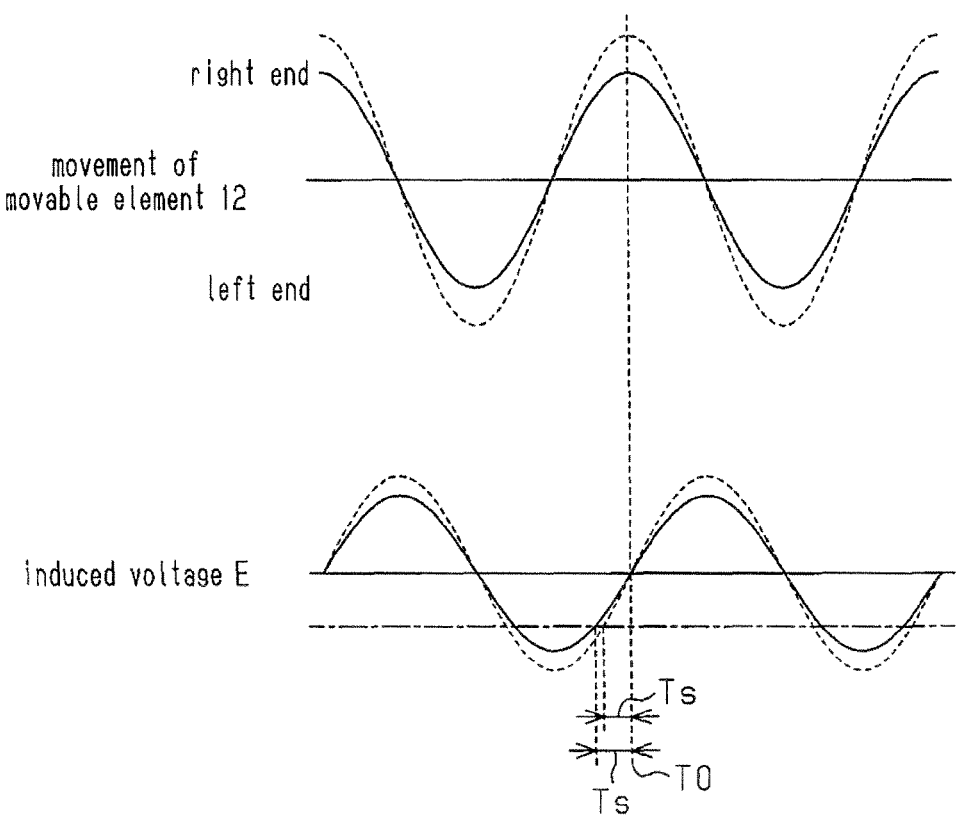
FIG. 5 is a timing chart illustrating detected values.

When viewed from a different point, the induced voltage E of the coil 11a is determined by electromagnetic force, amplitude, and frequency. In this case, the change in the induced voltage E relies on only the amplitude of the movable element 12. Thus, the induced voltage E becomes larger as the amplitude of the movable element 12 increases. Therefore, as shown in FIG. 5, when the amplitude of the movable element 12 increases, the time difference Ts becomes shorter (refer to broken lines). In contrast, when the amplitude of the movable element 12 decreases, the time difference Ts becomes longer (refer to solid lines). Thus, the time difference Ts may be converted to the amplitude (speed).

When the reference voltage V1 is set to be higher than the reference voltage V0 by a predetermined voltage, the amplitude (speed) may be obtained by detecting the time difference Ts from the time T0 when the amplified voltage Vn reaches the reference voltage V0 to the time T1 when the amplified voltage Vn reaches the reference voltage V1.

As shown in FIG. 3, such an amplitude detection is performed during a non-energized period Tnc, in which the driving current Id does not flow to the coil 11a. The non-energized period Tnc may be set, for example, by PWM-controlling the output of the driving current to the coil 11a while limiting the maximum output width of a PWM output. Also, when the movable element 12 is driven in one direction by PWM control and driven in the other direction by a fixed output, the remaining time after the fixed output is performed may be set as the non-energized period Tnc.

The example of FIG. 3 performs the above amplitude detection at the reversing point in one direction (reversing point at the right side). However, the amplitude detection may be performed at the reversing points in the two directions (reversing points at the left and right sides).

The amplitude calculation circuit 45, which is shown in FIG. 2, provides the memory 46 and the control output unit 50 with a signal indicating the detected speed (amplitude) of the movable element 12.

The control circuit 47 compares two speeds (e.g., speed that is the newest detected value and speed that is the preceding detected value) of different times stored in the memory 46. Based on a difference indicating the comparison result, the control circuit 47 determines the present situation and changes the control mode.

More specifically, when determining that the difference indicating the comparison result satisfies a power-up determination condition, the control circuit 47 changes the control mode from the normal control to the power-up control to increase the speed of the movable element 12.

Figure 6:
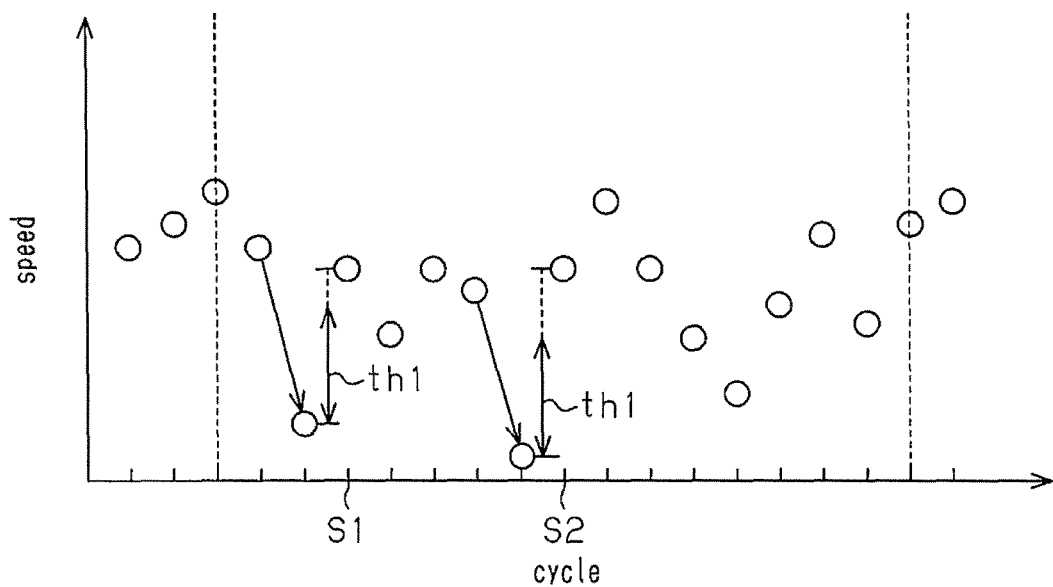
FIG. 6 is a timing chart illustrating the operation of a control circuit.

The power-up determination condition of the present embodiment includes a determination condition that is satisfied when the comparison result satisfies a power-up factor condition twice, which is a predetermined number of times, or more within a predetermined number of cycles of the movable element 12, which are sixteen cycles. The power-up factor condition of the present embodiment is set as a first condition. The first condition is satisfied when the speed of a detected value is larger than the speed of the preceding detected value by a predetermined first set value th1 (refer to FIG. 6) or greater and the speed of the preceding detected value is smaller than the further preceding detected value. For example, as shown in FIG. 6, when the speed (detected value) changes, if the first condition is satisfied twice or more within the sixteen cycles, which is indicated by broken lines, the control mode is changed to the power-up control. If the first condition is satisfied less than twice, the control mode is not changed from the normal control to the power-up control. FIG. 6 illustrates an example that satisfies the first condition (power-up factor condition) in cycles s1 and s2. In this case, the control mode is changed from the normal control to the power-up control. In the present embodiment, one cycle of the movable element 12 is approximately 4 microseconds.

Additionally, the control circuit 47 of the present embodiment determines whether or not to continue the power-up control based on the comparison result during a period from when the control mode is changed to the power-up control until the predetermined recovery setting period Tx (e.g., several seconds, refer to FIG. 7) elapses. When determining to continue the power-up control during the recovery setting period Tx, the control circuit 47 resets a count value of the recovery setting period Tx. When determining to discontinue the power-up control during the recovery setting period Tx, the control circuit 47 changes the control mode to the original control mode (normal control). Each time calibration in FIG. 7 corresponds to sixteen cycles of the movable element 12.

The control output unit 50 generates the PWM signal so that an output timing of the driving current Id is controlled in accordance with the reversing timing of the movable element 12, which is detected by the amplitude calculation circuit 45. More specifically, as shown in FIG. 3, when the predetermined period Ta elapses from when the movable element 12 reaches the reversing point, the control output unit 50 activates the two switching elements Q1 and Q4 for the predetermined period Tb. This supplies the driving current Id to the coil 11*a* to move the movable element 12 in a first direction. Also, after the predetermined period Tc (>Ta+Tb) elapses from when the movable element 12 reaches the reversing point, the control output unit 50 activates the two switching elements Q2 and Q3 for the predetermined period Td. This supplies the driving current Id to the coil 11*a* to move the movable element 12 in a direction opposite to the first direction.

Further, the control output unit 50 generates the PWM signal so that the amplitude (speed) of the movable element 12 conforms to a target value based on control information from the amplitude calculation circuit 45. For example, the control output unit 50 controls the amount of the driving current Id so that the amplitude (speed) of the movable element 12 conforms to the target value. More specifically, the control output unit 50 controls the amount of the driving current Id by controlling lengths of the above two predetermined periods (activation periods), that is, the duty ratios, so that the amplitude (speed) of the movable element 12 conforms to the target value. In the present embodiment, when the control mode is changed from the normal control to the power-up control, the target value of the amplitude (speed) of the movable element 12 is set to be greater than that used during the normal control.

The operation and effect of the electric shaver 1 (particularly, control circuit 47) configured in the above manner will now be described with reference to FIGS. 6 and 7.

For example, here, the movable element 12 of the linear actuator 10 is reciprocated by the driving current Id supplied from the driving circuit 30. The internal blade (not shown) is reciprocating together with the movable element 12. In this case, the speed (amplitude) of the movable element 12 is detected whenever the movable element 12 reaches the reversing point. The speed (amplitude) of the movable element 12 is stored in the memory 46. The control circuit 47 compares two speeds of different times stored in the memory 46. Based on the difference indicating the comparison result, the control circuit 47 determines the present situation and changes the control mode.

For example, within the sixteen cycles indicated by broken lines in FIG. 6, two cycles s1 and s2 satisfy the first condition, in which the speed of the movable element 12 is larger than the preceding speed by the predetermined first set value th1 or greater and the preceding speed is smaller than the further preceding speed. Here, the preceding speed is a speed detected one calibration before each of the cycles s1 and s2, and the further preceding speed is a speed detected two calibrations before each of the cycles s1 and s2. In this case (refer to FIG. 6), during the preceding cycle of each of the cycles s1 and s2 (one calibration before), the load suddenly increases. This leads to a determination that there is a high probability of whiskers (relatively rigid whiskers) having been removed. It is determined that there is a high probability that whiskers (relatively thick whiskers) have been removed a number of times within the sixteen cycles. This results in a determination that the portion being shaved is where whiskers are dense. Thus, the control mode is changed from the normal control to the power-up control.

When it is determined that there is no high probability that whiskers have been removed a number of times within the sixteen cycles, it is determined that the portion that is being shaved is where whiskers are sparse or where unshaved irregular whiskers have been left. Thus, the control mode is not changed from the normal control to the power-up control and continues to be in the normal control.

Figure 7:
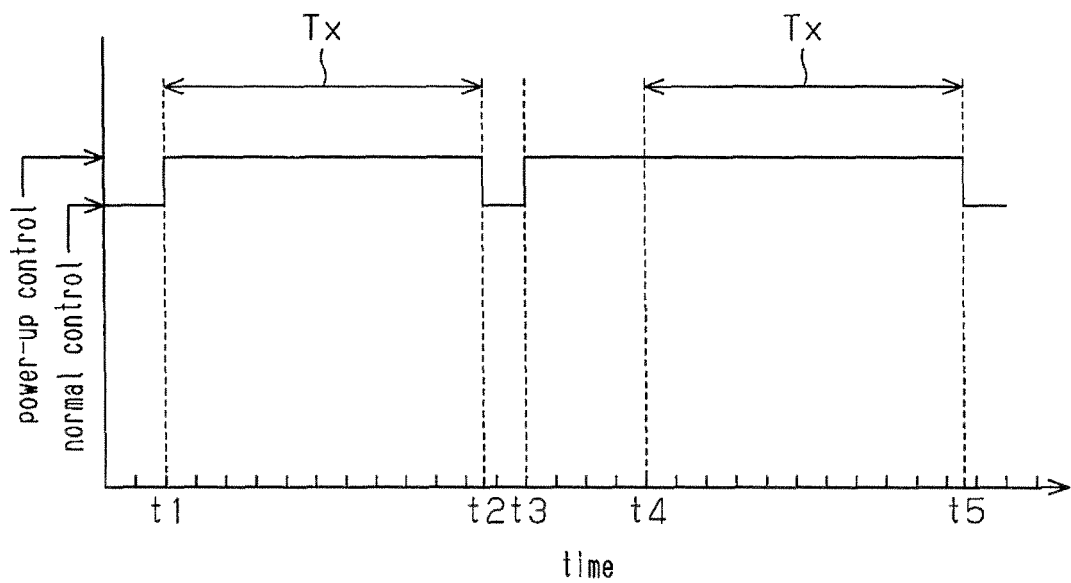
FIG. 7 is a timing chart illustrating the operation of the control circuit.

For example, as shown in FIG. 7, the present embodiment determines whether or not to continue the power-up control using the same comparison as described above (power-up determination condition) when the control mode is changed from the normal control to the power-up control at timing t1 until the predetermined recovery setting period Tx elapses. When discontinuation of the power-up control (power-up determination condition is not satisfied) is determined during the recovery setting period Tx, the control mode returns to the original control mode (normal control) (timing t2). When the control mode is changed from the normal control to the power-up control at timing t3, and then continuation of the power-up control (power-up determination condition is satisfied) is determined at timing t4, which is within the recovery setting period Tx, a count value related to the recovery setting period Tx is reset. Then, when discontinuation of the power-up control is determined during the recovery setting period Tx, the control mode returns to the original control mode (normal control) (timing t5).

Accordingly, the present embodiment has the advantages described below.

(1) The speed that is the detected value is compared with the speed, which is a detected value obtained in the past. Based on the difference indicating the comparison result, the situation is determined in a further highly accurate manner to change the control mode of the movable element 12. This allows for a further optimal control to be performed in accordance with each situation. More specifically, the removal of whiskers can be determined with highly accuracy. This allows for the optimal control to be performed.

(2) When the power-up determination condition is satisfied, the control mode is changed from the normal control to the power-up control to increase the speed of the movable element 12. Thus, for example, portions where whiskers are dense can be shaved in a satisfactory manner. Also, when the power-up determination condition is not satisfied, the normal (non-power-up) control is performed so as not to irritate the skin and reduce unnecessary power consumption.

(3) The power-up determination condition includes the determination condition that is satisfied when the comparison result satisfies the power-up factor condition (first condition) a predetermined number of times (twice) or more within the predetermined number of cycles (sixteen cycles) of the movable element 12. This allows for further optimal control to be performed. That is, when the power-up determination condition does not include such a determination condition, the power-up control has a tendency of being performed even when removing just a single whisker. Since such a situation can be limited, a portion where whiskers are dense is determined with highly accuracy. This allows for a further optimal control to be performed.

(4) The power-up factor condition includes the first condition, which is satisfied when the speed of a detected value is larger than the speed of the preceding detected value by the predetermined first set value th1 or greater and the speed of the preceding detected value is smaller than the further preceding detected value. That is, the power-up factor condition includes the first condition that is satisfied when the speed is decreased first and then increased by the first set value th1 or greater. Thus, the detection of the preceding detected value (at the timing preceding (a calibration before) the cycles s1 and s2) allows for the removal of whiskers to be calculated with a high probability. This allows for a further optimal control to be performed.

(5) Even during a period from when the control mode is changed from the normal control to the power-up control until the predetermined recovery setting period Tx elapses, the determination of whether or not to continue the power-up control is performed in accordance with the comparison result. Determination to continue the power-up control during the recovery setting period Tx resets the count value of the recovery setting period Tx. Determination to discontinue the power-up control during the recovery setting period Tx returns the control mode to the original control mode (normal control). This allows for further optimal control to be performed in accordance with the situation. More specifically, the control mode will not return to the normal control when a portion with dense whiskers is being shaved. Also, after the recovery setting period Tx elapses, the normal control is performed so as not to irritate the skin irritation and reduce unnecessary power consumption.

The above embodiment may be modified as follows.

The power-up determination condition of the above embodiment may be changed to a different condition that compares a detected value (at least one of movement, speed, and acceleration of the movable element 12) with a detected value obtained in the past, that is, compares two detected values that are detected at different times, and determines in accordance with the difference indicating the comparison result.

Also, in the same manner, the power-up factor condition may be changed to a different condition.

Figure 8:
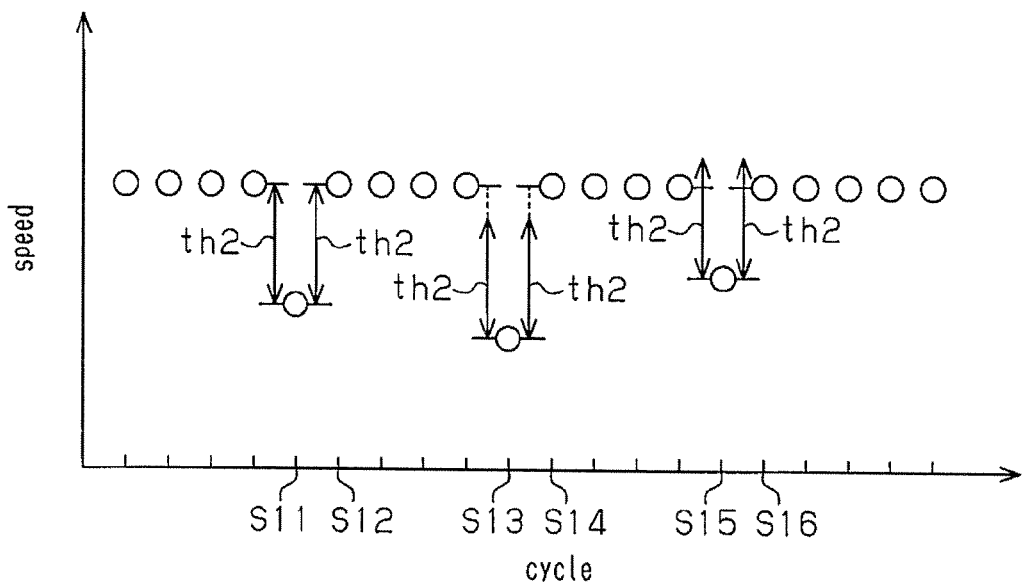
FIG. 8 is a timing chart illustrating the operation of one example of the control circuit.

For example, the power-up determination condition may be set to be satisfied when a detected value differs from the preceding detected value (difference condition). In this case, for example, when the speed (detected value) changes as shown in FIG. 8, the power-up determination condition (difference condition) is satisfied in each of cycles (timings) s11 to s16. Then, the control mode is changed to the power-up control when the normal control is performed.

Also, for example, the power-up determination condition may include a second condition that is satisfied when the difference of a detected value (speed) and the preceding detected value (speed) is larger than the predetermined second set value th2. In this case, for example, when the speed (detected value) changes as shown in FIG. 8, the power-up determination condition (second condition) is satisfied in each of cycles (timings) s11 to s14. Then, the control mode is changed to the power-up control when the normal control is performed. When the speed (detected value) changes as shown in FIG. 8, the power-up determination condition (second condition) is not satisfied in cycles (timings) s15 and s16. Thus, even when the normal control is currently performed, the control mode is not changed to the power-up control and continues the normal control. In addition, the second condition may be used as the power-up factor condition.

Figure 9:
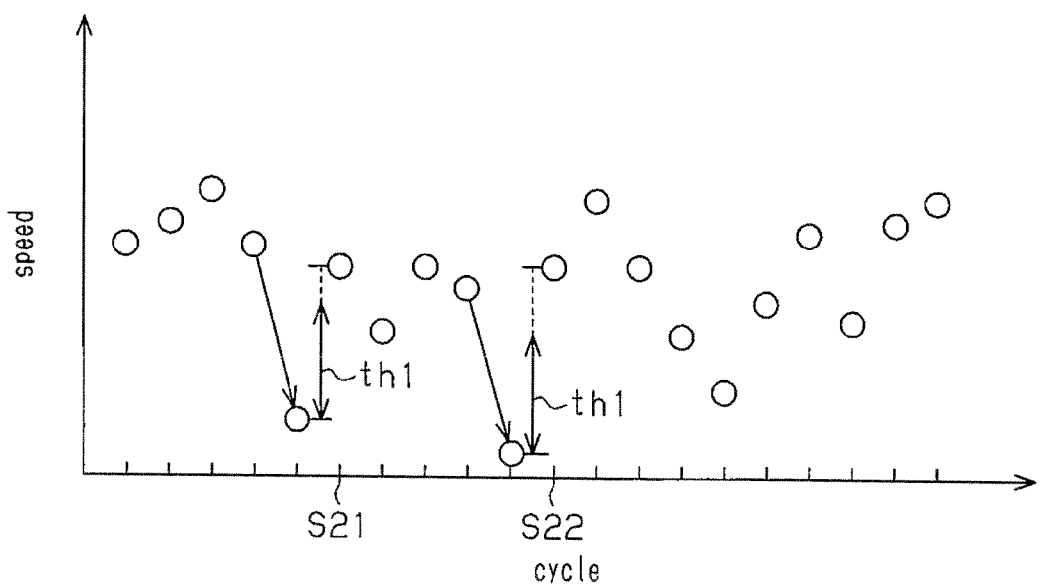
FIG. 9 is a timing chart illustrating the operation of another example of the control circuit.

For example, the power-up determination condition may include the first condition of the above embodiment. In this case, for example, when the speed (detected value) changes as shown in FIG. 9, if the power-up determination condition (first condition) is each satisfied in cycles (timings) s21 and s22 and the control mode is set to the normal control, the control mode is changed to the power-up control. That is, this example does not include the determination condition of the above embodiment. The control mode is changed to the power-up control in cycle (timing) s21.

In the above embodiment, the power-up determination condition is constant, however, not limited in such a manner. The control circuit 47 may change the condition (power-up determination condition) that changes the control mode of the movable element 12 in accordance with a time elapsed after the movable element 12 is activated.

Figure 10:
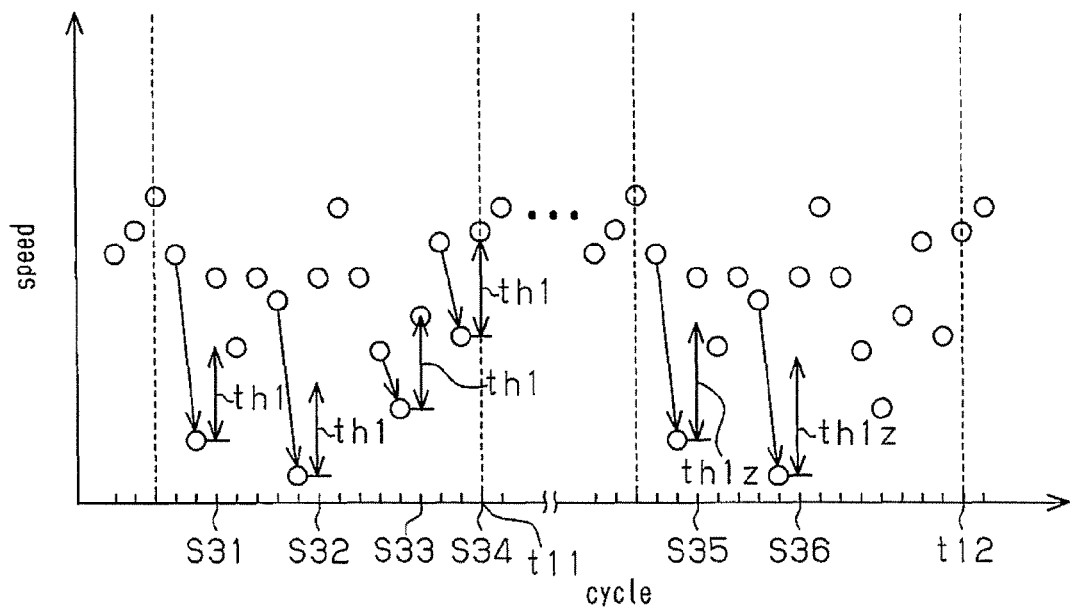
FIG. 10 is a timing chart illustrating the operation of another example of the control circuit.

For example, when a predetermined period elapses after the movable element 12 is activated, the first set value th1 of the above embodiment may be changed to a larger first set value th1z (refer to FIG. 10). Also, the value of the number determination condition in the above embodiment may be changed. For example the power-up determination condition may include a determination condition that is satisfied when the power-up factor condition is satisfied three times or more within sixteen cycles.

The operation of the above case will now be described when the speed (detected value) changes as shown in FIG. 10. During a period that is shorter than the predetermined period elapsed after the movable element 12 is activated (in FIG. 10, left side), the power-up factor condition (first condition) is satisfied in each of cycles (timings) s31 to s34. Thus, at timing t11, the determination condition is satisfied a predetermined number of times, and, consequently, the power-up determination condition is satisfied. This changes the control mode from the normal control to the power-up control. During a period that is longer than the predetermined period elapsed after the movable element 12 is activated (in FIG. 10, right side), the power-up factor condition (first condition) is satisfied in each of cycles (timings) s35 and s36. However, at timing t12, the determination condition is not satisfied a predetermined number of times, and, consequently, the power-up determination condition is not satisfied. Thus, the control mode, which is not changed from the normal control to the power-up control, continues to be normal control. In FIG. 10, to simplify the illustration, the change in the speed (detected value) is set to be the same for each period. However, the control mode is changed from the normal control to the power-up control during the early period, while the control mode is not changed from the normal control to the power-up control and continues the normal mode during a late time stage (due to the larger value set for the first set value th1z). That is, in an early time stage after activation, the probability of many whiskers remaining is high. Therefore, an easy condition is used to change the control mode from the normal control to the power-up control. This allows for satisfactory hair removal to be performed. Additionally, in a late time stage after activation, the probability of many whiskers remaining is low. Therefore, the control mode is not changed from the normal control to the power-up control by the easy condition. This decreases skin irritation and reduces unnecessary power consumption. That is, further optimal control may be performed in accordance with each situation.

The above embodiment determines whether or not to continue the power-up control during a period from when the control mode is changed from the normal control to the power-up control until the predetermined recovery setting period Tx elapses. However, the control mode may be returned to the original control mode (normal control) without performing the determination when the recovery setting period Tx has elapsed.

Figure 11:
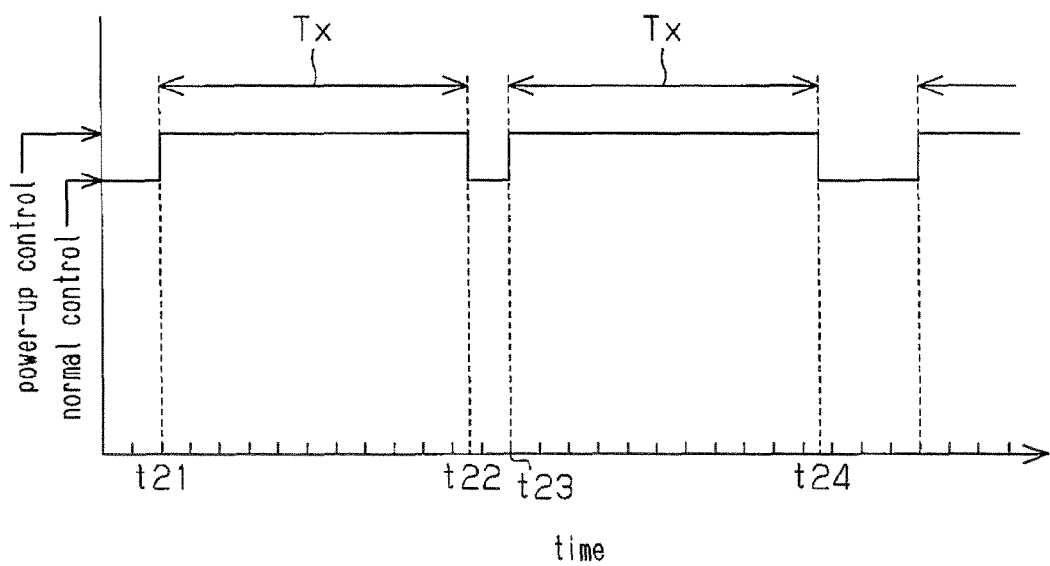
FIG. 11 is a timing chart illustrating the operation of another example of the control circuit.

In this case, for example, as shown in FIG. 11, if the control mode is changed from the normal control to the power-up control at the timing t21, the control mode returns to the original control mode (normal control) when the predetermined recovery setting period Tx has elapsed (timing t22) regardless of the subsequent change in the detected value (speed). Additionally, if the control mode is changed from the normal control to the power-up control at the timing t23, the control mode returns to the original control mode (normal control) when the predetermined recovery setting period Tx has elapsed (timing t24) regardless of the subsequent change in the detected value (speed). This also, for example, reduces unnecessary power consumption. The above embodiment may be changed to determine whether or not to continue the power-up control using a condition that differs from the power-up determination condition used when changing to the power-up control.

In the above embodiment, the control circuit 47 changes the control mode from the normal control to the power-up control when the power-up determination condition is satisfied. Alternatively, the control mode may be changed to a power-down control to decrease the speed of the movable element 12 when a power-down determination condition is satisfied. Additionally, the control circuit may change the control modes in three or more stages in accordance with a difference (i.e., situation determined accordingly) of the detected value, which is the comparison result.

The above embodiment compares the reference voltage with the speed, which is the detected value. However, the reference voltage may be compared with at least one of the movement, speed, and acceleration of the movable element 12. Then, the control mode of the movable element may be changed in accordance with a difference indicating the comparison result (by determining the situation).

The above embodiment changes the target value of the amplitude of the movable element 12 to change the control mode of the movable element 12. Instead, for example, the control mode of the movable element 12 may be changed by changing a target value of the frequency of the driving current Id supplied to the coil 11a. Also, the control mode of the movable element 12 may be changed by changing the two target values of the amplitude and the frequency of the driving current Id.

The above embodiment detects the speed (amplitude) of the movable element 12 by detecting the induced voltage E generated in the coil 11a. Instead, the movement and acceleration of the movable element 12, which are correlated with the speed, may be detected. An acceleration sensor or the like may be additionally arranged as a detection means to detect at least one of the movement, speed, and acceleration of the movable element 12 from an output or the like of the sensor.

The movable element 12 of the present embodiment may include an electromagnet instead of the permanent magnet 12a. In this case, a fixed element that is formed by a permanent magnet may be used instead of the fixed element 11 that is formed by an electromagnet.

The above embodiment is used in the electric shaver 1, which serves as a hair removal device, however, may be used in a different hair removal device, such as a hair clipper or an epilator that remove hair other than whiskers.

The invention claimed is:

1. A hair removal device comprising:
    a linear actuator that includes a fixed element, which includes one of an electromagnet and a permanent magnet, and a movable element, which includes the other of the electromagnet and the permanent magnet;
    a detection unit that detects at least one of movement, speed, and acceleration of the movable element; and
    a control unit that compares a detected value of the detection unit with a detected value obtained in the past and changes a control mode of the movable element in accordance with a difference indicating a comparison result,
    wherein the control unit changes the control mode of the movable element from a normal control to a power-up control that increases the speed of the movable element when determining that the comparison result satisfies a predetermined power-up determination condition.

2. The hair removal device according to claim 1, wherein the power-up determination condition includes a determination condition that is satisfied when the comparison result satisfies a predetermined power-up factor condition a predetermined number of times or more within a predetermined period or within predetermined number of cycles of the movable element.

3. The hair removal device according to claim 1, wherein the power-up determination condition or the power-up factor condition includes a first condition that is satisfied when the detected value is larger than the preceding detected value by a predetermined first set value or greater and the preceding detected value is smaller than the further preceding detected value.

4. The hair removal device according to claim 1, wherein the power-up determination condition or the power-up factor condition includes a second condition that is satisfied when a difference of the detected value and the preceding detected value is larger than or equal to a predetermined second set value.

5. The hair removal device according to claim 1, wherein the control unit changes a condition that changes the control mode of the movable element in accordance with an elapsed time from when the movable element is activated.

6. The hair removal device according to claim 1, wherein the control unit
    counts time from when the control mode of the movable element is changed until a predetermined recovery setting period elapses,
    determines whether or not to continue the control mode, which has been changed in accordance with the comparison result, during the recovery setting period,
    resets a count value related to the recovery setting period when determining to continue the control mode within the recovery setting period, and
    returns the control mode to an original control mode when determining to discontinue the control mode within the recovery setting period.

7. The hair removal device according to claim 1, wherein the control unit returns the control mode to an original control mode when a predetermined recovery setting period elapses after the control mode of the movable element is changed.

8. A method for driving a hair removal device provided with a linear actuator that includes a fixed element, which includes one of an electromagnet and a permanent magnet, and a movable element, which includes the other of the electromagnet and the permanent magnet, the method comprising:
    detecting at least one of movement, speed, and acceleration of the movable element;
    comparing a detected value with a detected value obtained in the past; and
    changing a control mode of the movable element in accordance with a difference indicating a comparison result, wherein the changing includes changing the control mode of the movable element from a normal control to a power-up control that increases the speed of the movable element when determining that the comparison result satisfies a predetermined power-up determination condition.

* * * * *